United States Patent
Kim et al.

(10) Patent No.: US 9,112,609 B2
(45) Date of Patent: Aug. 18, 2015

(54) MITIGATION OF POLARIZATION DEPENDENT LOSS IN OPTICAL MULTI-CARRIER/SUPER-CHANNEL TRANSMISSION

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 143 days.

(21) Appl. No.: 13/914,211

(22) Filed: Jun. 10, 2013

(65) Prior Publication Data

US 2014/0363164 A1     Dec. 11, 2014

(51) Int. Cl.
- H04J 14/06 (2006.01)
- H04B 10/2507 (2013.01)
- H04B 10/548 (2013.01)

(52) U.S. Cl.
CPC .......... *H04B 10/2572* (2013.01); *H04B 10/548* (2013.01); *H04J 14/06* (2013.01)

(58) Field of Classification Search
USPC ......... 398/25, 29, 34, 65, 152, 158–162, 182, 398/184, 192–201
See application file for complete search history.

(56) References Cited

U.S. PATENT DOCUMENTS

| | | | | |
|---|---|---|---|---|
| 5,841,557 A * | 11/1998 | Otsuka et al. | | 398/65 |
| 7,067,795 B1 * | 6/2006 | Yan et al. | | 250/225 |
| 7,724,987 B2 * | 5/2010 | Glebov | | 385/11 |
| 2004/0070749 A1 * | 4/2004 | Beal et al. | | 356/73.1 |
| 2004/0190121 A1 * | 9/2004 | Popov et al. | | 359/337 |
| 2004/0197103 A1 * | 10/2004 | Roberts et al. | | 398/159 |
| 2004/0208646 A1 | 10/2004 | Choudhary et al. | | |
| 2008/0191126 A1 * | 8/2008 | Adams et al. | | 250/227.19 |
| 2009/0162059 A1 * | 6/2009 | Nakamoto | | 398/48 |
| 2010/0021166 A1 * | 1/2010 | Way | | 398/79 |
| 2011/0170869 A1 * | 7/2011 | Mandai et al. | | 398/65 |
| 2011/0268456 A1 * | 11/2011 | Nakamoto | | 398/152 |
| 2012/0063781 A1 * | 3/2012 | Vassilieva et al. | | 398/65 |
| 2012/0063783 A1 * | 3/2012 | Vassilieva et al. | | 398/81 |
| 2012/0251119 A1 | 10/2012 | McNicol et al. | | |

(Continued)

OTHER PUBLICATIONS

Vassilieva et al.; "Interplay between PDL and nonlinear effects in coherent polarization multiplexed systems"; Optics Express, vol. 19, No. 26; pp. 6, 2011.

(Continued)

*Primary Examiner* — Li Liu
(74) *Attorney, Agent, or Firm* — Baker Botts L.L.P.

(57) ABSTRACT

Methods and systems for mitigating effects of polarization dependent loss (PDL) in an optical network transmitting a multi-carrier optical signal comprising a plurality of subcarriers may involve assigning and modifying a state of polarization to each subcarrier prior to transmission. An assigned state of polarization for each subcarrier may be modified for the subcarrier in the digital domain and/or the optical domain. Various specific assignment methods may be used, including individual subcarrier assignment, subcarrier set assignment, arbitrary subcarrier group assignment, random assignment, and/or combinations thereof. The assigned states of polarization may be selected based on a resulting minimum PDL-induced peak-to-peak power variation over a sum of the subcarriers for all orientations of a principal axis of PDL.

18 Claims, 11 Drawing Sheets

(56) References Cited

U.S. PATENT DOCUMENTS

| | | | |
|---|---|---|---|
| 2012/0263455 A1 | 10/2012 | Wang et al. | |
| 2012/0315043 A1* | 12/2012 | Nakagawa et al. | 398/65 |
| 2013/0004162 A1* | 1/2013 | Osaka | 398/34 |
| 2013/0011138 A1 | 1/2013 | Kim et al. | |
| 2013/0058648 A1 | 3/2013 | Ji et al. | |
| 2014/0341587 A1* | 11/2014 | Nakashima et al. | 398/115 |

OTHER PUBLICATIONS

Vassilieva et al.; "Statistical Analysis of the Interplay between Nonlinear and PDL Effects in Coherent Polarization Multiplexed Systems"; ECOC Technical Digest; pp. 3, 2012.

Li; "Recent Advances in Coherent Optical Communication"; Advances in Optics and Photonics, vol. 1; pp. 279-307, 2009.

Liu et al.; "Joint digital signal processing for superchannel coherent optical communications systems"; Optics Express, vol. 21, No. 7; pp. 15, 2013.

Chandrasekhar et al.; "OFDM Based Superchannel Transmission Technology"; Journal of Lightwave Technology, vol. 30, No. 24; pp. 8, 2012.

Infernia; "Super-Channels: DWDM Transmission at 100Gb/s and Beyond"; White Paper; pp. 13, 2012.

Shieh et al.; "Coherent optical OFDM: theory and design"; Optics Express, vol. 16, No. 2; pp. 841-859, 2008.

Lach et al.; "Modulation Formats for 100G and beyond"; Optical Fiber Technology, vol. 17; pp. 377-386, 2011.

Shibahara et al.; "Experimental Demonstration of PDL Penalty Reduction by Wavelength-Interleaving Transmission"; ECOC Technical Digest; pp. 3, 2012.

Xie et al.; "FEC Performance of PMD-Impaired Optical Communication System With Multiple-Wavelength Interleaving"; IEEE Photonics Technology Letters, vol. 16, No. 3; pp. 3, 2004.

Hillerkuss et al.; "26 Tbit s-1 line-rate super-channel transmission utilizing all-optical fast Fourier transform processing"; Nature Photonics, vol. 5; pp. 364-371, 2011.

* cited by examiner

MITIGATION OF POLARIZATION DEPENDENT LOSS IN OPTICAL MULTI-CARRIER/SUPER-CHANNEL TRANSMISSION

BACKGROUND

1. Field of the Disclosure

The present disclosure relates generally to optical communication networks and, more particularly, to a system and method for mitigating signal degradation in dual polarization optical systems.

2. Description of the Related Art

Telecommunications systems, cable television systems and data communication networks use optical networks to rapidly convey large amounts of information between remote points. In an optical network, information is conveyed in the form of optical signals through optical fibers. Optical networks may also include various network subsystems such as amplifiers, dispersion compensators, multiplexer/demultiplexer filters, wavelength selective switches, couplers, etc. configured to perform various operations within the network.

However, each of these network subsystems may also introduce polarization dependent effects on the optical signals traveling through the network. These effects may cause the different polarization components of the optical signals to experience signal degradation due to polarization dependent loss (PDL) and nonlinear effects caused by cross talk among polarization components. For example, PDL may cause an imbalance in the optical signal-to-noise ratio (OSNR) between states of polarization (SOP), such that one polarization component exhibits a degraded OSNR at a receiver compared to another polarization component. Furthermore, depending on the symbols transmitted, cross talk among polarization components due to PDL may result in intensity variations that are observed as nonlinear phase noise.

SUMMARY

In one aspect, a disclosed method for mitigating the impact of polarization dependent loss in an optical network includes identifying a plurality of subcarriers associated with a multi-carrier optical signal and determining a plurality of states of polarization respectively corresponding to the plurality of subcarriers. Prior to transmission of the multi-carrier optical signal, the method may include modifying actual states of polarization of the plurality of subcarriers to respectively correspond to the plurality of states of polarization. The plurality of states of polarization may have dual polarization components.

Additional disclosed aspects for mitigating the impact of polarization dependent loss in an optical network include a system comprising a processor and non-transitory computer readable memory media storing processor-executable instructions, as well as a polarization control system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
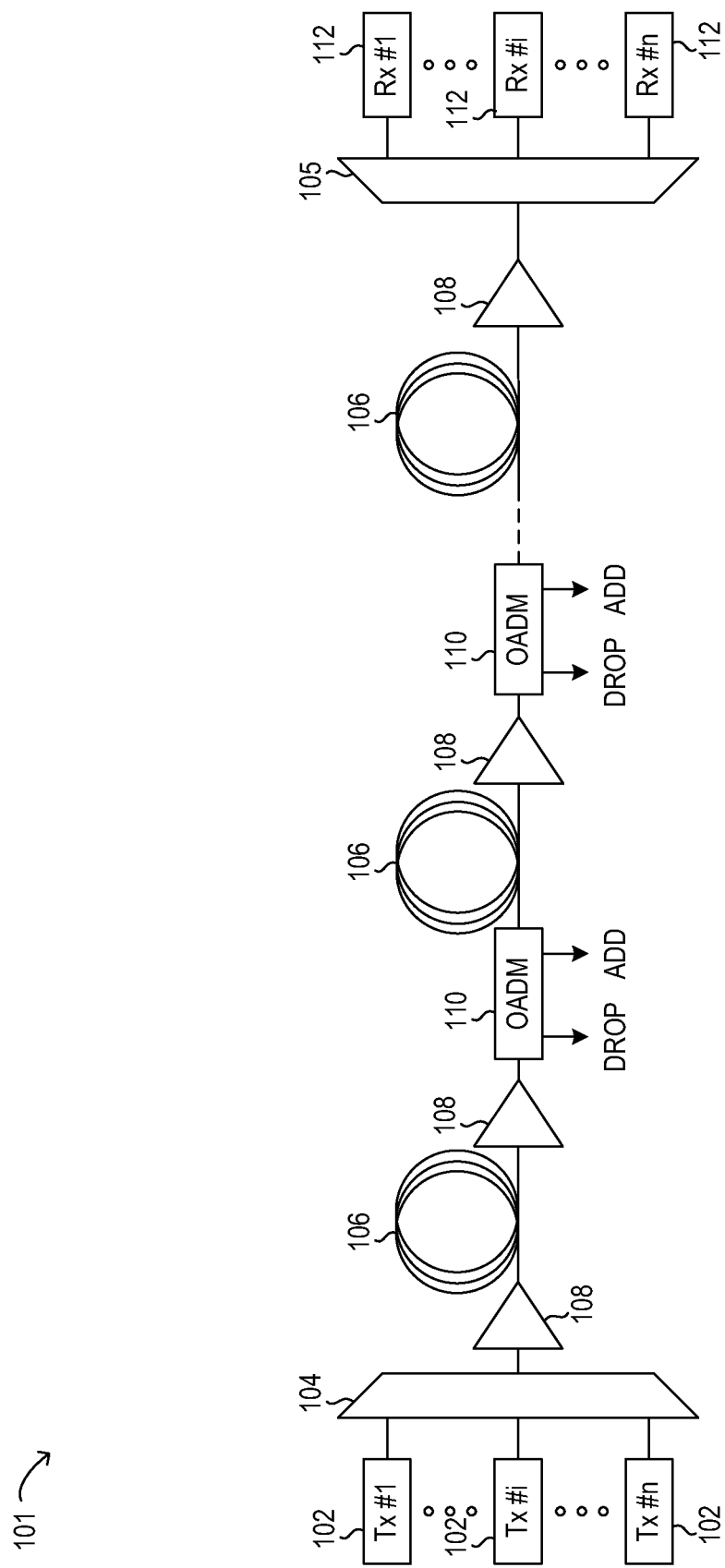
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 illustrates an example embodiment of optical transmission network 101. Optical transmission network 101 may include one or more optical fibers 106 configured to transport one or more optical signals communicated by components of optical network 101. The network subsystems of optical network 101, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber.

Optical network 101 may include devices configured to transmit optical signals over fibers 106. Information may be transmitted and received through network 101 by modulation of one or more wavelengths of light to encode the information on the wavelength. In optical networking, a wavelength of light may also be referred to as a channel. Each channel may be configured to carry a certain amount of information through optical network 101.

To increase the information carrying capabilities of optical network 101, multiple signals transmitted at multiple channels may be combined into a single optical signal, which is referred to herein as a "multi-carrier" optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Another multi-carrier technique is orthogonal frequency division multiplexing (OFDM). Optical network 101 may be configured to transmit disparate channels using WDM, DWDM, or some other suitable multi-carrier multiplexing technique, and to amplify the multi-carrier signal.

Recently, advancements in DWDM enabled combining several optical carriers to create a composite optical signal of a desired capacity. One such example of a multi-carrier optical signal is a super-channel, which may include a plurality of subcarriers in a tightly packed spectral band, and which may exceed transmission rates of 100 Gb/s or higher. A distinctive feature of super-channels is that the subcarriers in a super-channel travel from the same origin to the same destination, and cannot be added or removed using an OADM while in transmission. Various methods may be employed to form a super-channel. Particular embodiments of forming a super-channel with high spectral efficiency include No-Guard Interval Orthogonal Frequency Division Multiplexing (NGI-OFDM) super-channels, Nyquist Wavelength Division Multiplexing (WDM) super-channels, Digital Signal Processing (DSP)-based OFDM super-channels, and WDM super-channels.

In NGI-OFDM, each subcarrier modulator may be a regular single carrier modulator that applies pulse shaping in the time domain, for example, using a non-return to zero (NRZ) pulse form. When the baud rate of an NGI-OFDM super-channel corresponds to the spacing between the channels, then cross talk between the channels may be eliminated. Since no guard interval is used in an NGI-OFDM super-channel, the overhead for the guard interval and/or a cyclic prefix may be avoided.

In a Nyquist-WDM super-channel, each subcarrier modulator may employ DSP for pulse shaping in the time domain and digital-to-analog conversion (DAC), for example, using a sinc-profile pulse. Since each Nyquist subcarrier has a rectangular spectral profile, cross talk between channels may be eliminated.

In DSP-based OFDM super-channels, each modulator may employ DSP for OFDM and DAC to generate subcarriers in an OFDM band having a sinc-profile spectra. The OFDM bands may then be combined to form the super-channel signal using a rectangular spectral profile, similar to Nyquist-WDM. The cross talk between edge subcarriers of neighboring OFDM bands may be reduced to a negligible level when OFDM conditions are satisfied between bands (i.e., the OFDM band spacing exceeds the baud rate) or when a guard band is used between OFDM bands. Since the number of subcarriers in a DSP-based OFDM super-channel may be very large (i.e., 64, 128, 256, etc.), the symbol rate of each subcarrier will be substantially smaller than the overall transmission rate.

A WDM super-channel may be similarly modulated and transmitted as an NGI-OFDM, but using much larger channel spacing than the baud rate to avoid cross talk between channels. The subcarriers in a WDM super-channel may be separated using optical filters or arrayed-waveguide grating (AWG) demultiplexers. Accordingly, a WDM super-channel may have a relatively low spectral efficiency compared to the other types of super-channels and may be constrained in overall transmission rates, for example, to about 100 Gb/s.

Optical network 101 may include one or more optical transmitters (Tx) 102 configured to transmit optical signals through optical network 101 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 101. Amplifiers 108 may be positioned before and/or after certain lengths of fiber 106. Amplifiers 108 may comprise any system, apparatus, or device configured to amplify signals. OADMs 110 may be coupled to network 101 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination.

Network 101 may also include one or more demultiplexers 105 at one or more destinations of network 101. Demultiplexer 105 may comprise any system apparatus or device that may act as a demultiplexer by splitting a single WDM signal into its individual channels. For example, network 101 may transmit and carry a forty channel DWDM signal. Demultiplexer 105 may divide the single, forty channel DWDM signal into forty separate signals according to the forty different channels.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of OADMs 110 and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, network 101 may employ components compatible with flexible grid optical networking that enables specifying a particular frequency slot per channel. For example, each wavelength channel of a WDM transmission may be allocated using at least one frequency slot. For example, one frequency slot may be assigned to a wavelength channel whose symbol rate is low, while a plurality of frequency slots may be assigned to a wavelength channel whose symbol rate is high. Thus, in certain embodiments of network 101, OADM 110 may represent a reconfigurable OADM (ROADM) that is capable of adding or dropping individual or multiple wavelengths of a WDM signal carrying data channels to be added or dropped in the optical domain, for example, using a wavelength selective switch (WSS).

Network 101 may also include receivers 112 coupled to demultiplexer 105. Each receiver 112 may be configured to receive signals transmitted in a particular wavelength or channel, and process the signals for the information that they contain. Accordingly, network 101 may include at least one receiver 112 for every channel of the network.

Optical networks, such as network 101, may further employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

Modifications, additions or omissions may be made to network 101 without departing from the scope of the disclosure. For example, network 101 may include more or fewer elements than those depicted. Additionally network 101 may include additional elements not expressly shown, such as a dispersion compensation module. Also, as mentioned above, although depicted as a point to point network, network 101 may comprise any suitable network for transmitting optical signals such as a ring or mesh network.

In operation of network 101, the optical signals may be dual polarized, with orthogonal polarization components in the X and Y axes. In various embodiments of network 101, certain components of elements of network 101 may exhibit polarization dependent loss (PDL), which may result in degradation of optical signal-to-noise ratio (OSNR) of the transmitted optical signal, as well as nonlinear phase noise resulting from cross talk between the two orthogonal polarization components. Components of network 101 that may contribute to PDL (referred to herein individually as a "PDL tributary") include multiplexer 104, amplifier 108, OADM 110, as well as other components (not shown), including dispersion compensators, wavelength selective switches, couplers, etc. (see International Telecommunication Union ITU-T G.680). The polarization dependent loss may be observed for different types of modulation schemes used for transmitting optical signals.

It has been observed that the impact of PDL may depend on the alignment between a SOP of a dual polarization optical signal and the principal axis of a PDL tributary (see O. Vassilieva et al., "Statistical Analysis of the Interplay between Nonlinear and PDL Effects in Coherent Polarization Multiplexed Systems", ECOC'2012, paper We3C4). For example, when all subcarriers within a dual polarized multi-carrier optical signal have the same SOP, and that SOP happens to be the most disadvantageous alignment with respect to the respective principal axes of the PDL tributaries in the transmission path, then all the subcarriers will experience the worst impact from PDL. When each of the subcarriers within a dual polarized multi-carrier optical signal has a different SOP, even though one subcarrier may exhibit a worst alignment with respect to the PDL tributaries, the other subcarriers may be transmitted with a 'better than worst' alignment, which may result in an overall improvement. As will be described in further detail herein, the impact of PDL may accordingly be mitigated by setting SOP of each subcarrier with a different present value in a super-channel or an OFDM optical signal. The mitigation of the PDL impact in this manner may be observed through statistical analyses and improvement of forward error correction (FEC) limits among the subcarriers.

Specifically, network 101 may control an initial SOP of subcarriers to mitigate PDL when a multi-carrier optical signal is transmitted. The methods and systems disclosed herein may be associated with certain advantages compared to other techniques for mitigating PDL. For example, the methods and systems described herein may be implemented without the use of polarization scramblers, which may be costly and/or complex. Also, the methods and systems described herein may be implemented without feedback from a receiver to a transmitter, which may simplify network communications.

Figure 2A:
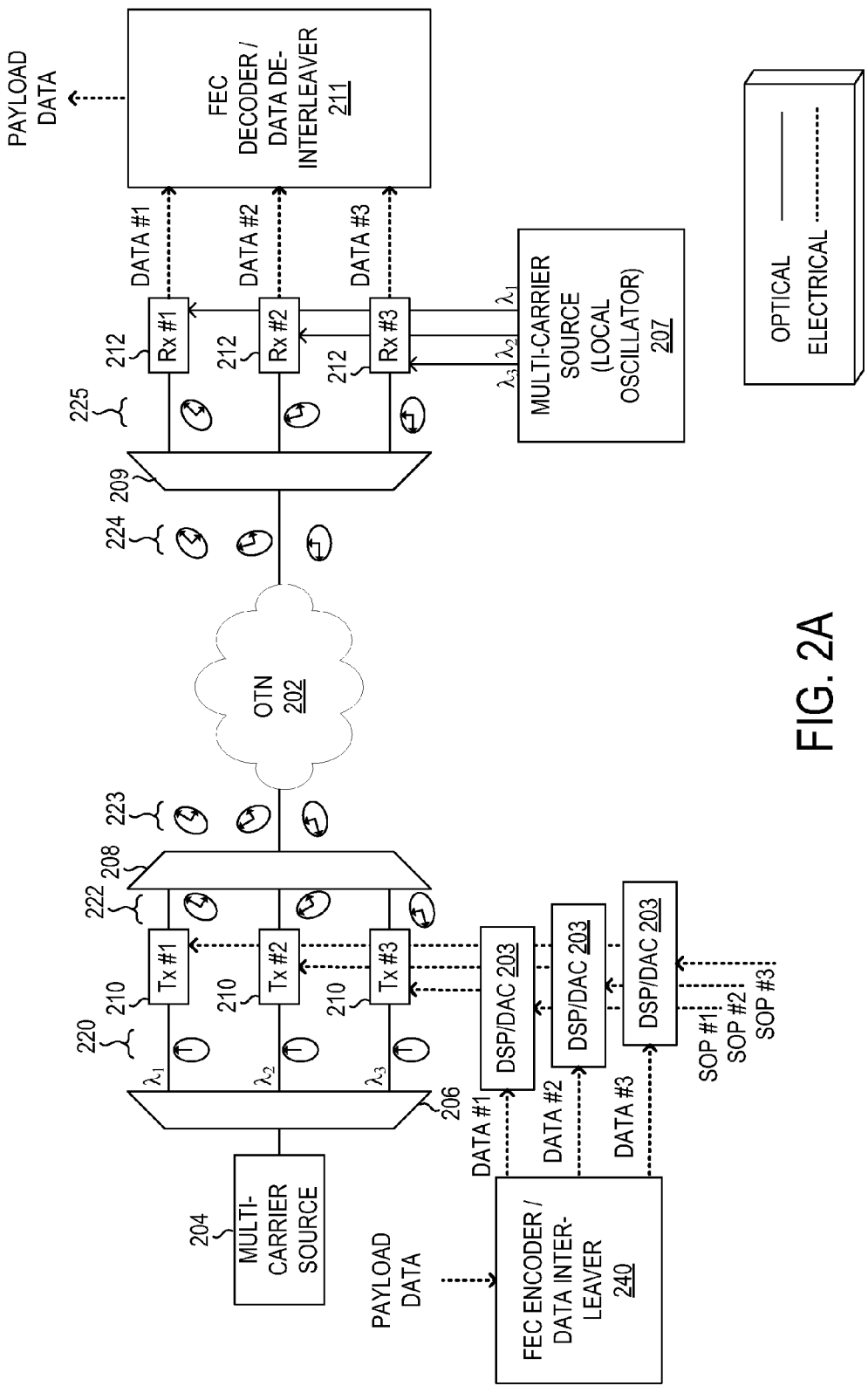
FIGS. 2A and 2B are block diagrams of selected elements of two embodiments of polarization control in an optical network.

Referring now to FIG. 2A, a block diagram of selected elements of an embodiment of network 200, which may employ polarization control to mitigate PDL, is shown. As shown in FIG. 2A, at least certain portions of network 200 may correspond to elements depicted in network 101 (see FIG. 1). In network 200, various optically transmitting elements are collectively shown as optical transmission network (OTN) 202, which may include various components described above with respect to network 101 (see FIG. 1), such as optical and/or digital network components for transmission of multi-carrier optical signals. In FIG. 2A, network 200 is shown implementing polarization control of individual subcarriers of a super-channel in the electrical domain using certain individual components for each subcarrier. Although network 200 is shown in FIG. 2A transmitting three subcarriers at arbitrary wavelengths $\lambda_1$, $\lambda_2$, and $\lambda_3$, it will be understood that in other embodiments (not shown), different numbers of subcarriers may be used. In network 200, payload data is transmitted across OTN 202 using three subcarriers, labeled as DATA #1, DATA #2, and DATA #3. In certain embodiments, the subcarriers are modulated using dual polarization quadrature phase shift keying (DP-QPSK). At least certain portions of network 200 may represent a polarization control system for setting states of polarization of individual subcarriers included in a multi-carrier optical signal.

In FIG. 2A, multicarrier source 204 may represent a source of signals for a plurality of subcarriers and may generate subcarriers using individual lasers or using a phase-locked method. As shown, multicarrier source 204 may generate three monochromatic wavelengths, whose arbitrary values are given by $\lambda_1$, $\lambda_2$, and $\lambda_3$, that are separated and individually output at demultiplexer 206 having SOP 220 that may be aligned to a given axis, for example, an axis of a modulator included in transmitter 210. At transmitter 210, each subcarrier may be independently modulated with corresponding payload data and polarization data provided by digital signal processor/digital-to-analog converters (DSP/DAC) 203, which may operate in the electrical/digital domain. As shown, FEC encoder/data interleaver 240 may receive the payload data stream and generate the subcarrier data streams, DATA #1, DATA #2, and DATA #3, which are fed to respective DSP/DACs 203, which receive SOP parameters (shown as SOP #1, SOP #2, and SOP #3) for each respective subcarrier and generate output signals for modulation at transmitter 210. In certain embodiments, transmitter 210 includes a dual polarization IQ modulator to enable each subcarrier to be individually rotated to desired SOP 222 that is specified by the polarization parameters. For example, the dual polarization IQ modulator may include two parallel optical IQ modulators for two orthogonal polarization components, respectively, and a polarization combiner.

As noted previously, optical signals, such as those output by transmitter 210, may exhibit dual polarization, which may be described by the arbitrary modulation functions:

$$E_x = XI + iXQ \qquad \text{Equation (1)}$$

$$E_y = YI + iYQ \qquad \text{Equation (2)}$$

where $E_x$ and $E_y$ are the electric field magnitudes in the x and y directions, respectively; XI and YI are the in-phase (real) data or components of the respective polarization waves; and XQ and YQ are the quadrature (imaginary) data or components of the respective polarization waves. Furthermore, a polarization rotation function may be defined as:

$$\begin{pmatrix} E'_x \\ E'_y \end{pmatrix} = R(\theta, \psi) \begin{pmatrix} E_x \\ E_Y \end{pmatrix} \qquad \text{Equation (3)}$$

where $E'_x$ and $E'_y$ are the output electric field signals after rotation; $\theta$ and $\phi$ are two angles that can describe any arbitrary rotation of SOPs; and $R(\theta,\psi)$ is a polarization rotation matrix given by:

$$R(\theta, \psi) = \begin{bmatrix} \cos(\theta/2) + i\sin(\theta/2)\cos(2\psi) & i\sin(\theta/2)\sin(2\psi) \\ i\sin(\theta/2)\sin(2\psi) & \cos(\theta/2) - i\sin(\theta/2)\cos(2\psi) \end{bmatrix} \quad \text{Equation (4)}$$

In this manner, SOP 222 may represent an arbitrary SOP, corresponding to specific values for ($\theta,\psi$), that may be realized for individual dual polarized subcarriers. In certain embodiments, values for ($\theta,\psi$) may be used as SOP parameters. The real part and imaginary parts of $E'_x$ may correspond to the in-phase and quadrature data of the X-polarization component, respectively, for redefined SOP of a dual polarization signal. The real part and imaginary part of $E'_y$ may correspond to the in-phase and quadrature data of the Y-polarization component, respectively, for redefined SOP of dual polarization signal.

In FIG. 2A, after optical combination into a multi-carrier optical signal (i.e., a super-channel) at multiplexer 208, each subcarrier maintains its arbitrary SOP 222, shown as combined SOP 223. It is noted that polarization maintaining optical fibers, demultiplexers, and/or multiplexers may be used at the transmitting end of network 200 to maintain SOP 222 and/or SOP 223. The multi-carrier optical signal may then be transmitted over OTN 202. During transmission over OTN 202, the SOP of the subcarriers may vary randomly due to various transmission effects, such as microbending and/or stress, which may cause a small birefringence in the optical fiber that results in rotations of SOP. In certain embodiments, the relative SOPs of the subcarriers may be retained to a certain extent after transmission over OTN 202.

In FIG. 2A, upon arrival at a receiving end of network 200, the multi-carrier optical signal may exhibit SOP 224, which may have varied from SOP 223 due to the transmission effects mentioned above. For example, in network 200, SOP 224 may represent a common rotation from SOP 223 for all subcarriers, while a relative rotation among the subcarriers is maintained. The multi-carrier optical signal may be optically separated into subcarrier components at demultiplexer 209, where the subcarriers have SOP 225. Each subcarrier may then be fed into respective receiver 212, which may include a local oscillator, a polarization diversity 90 degree optical hybrid, optical-to-electrical conversion, demodulation and digital domain processing (not shown). In one embodiment, receiver 212 may be a polarization diversity coherent receiver that can demultiplex two orthogonal polarization components using DSP for phase and polarization recovery, irrespective of the incoming SOPs of the dual polarized optical signal (see Li, G., "Recent Advances in Coherent Optical Communication", Advances in Optics and Photonics vol 1, pg 279-307 (2009)). In various embodiments, element 209 in FIG. 2A may represent an optical coupler/splitter such that the received super-channel signal is communicated to each receiver 212 (not shown), while a subcarrier signal may be selected by tuning a wavelength of a local oscillator (not shown) included in receiver 212 and the other subcarrier channels are rejected by an electrical filter. As shown in network 200, multi-carrier source (local oscillator) 207 may provide reference wavelengths ($\lambda_1$, $\lambda_2$, and $\lambda_3$) for mixing with individual subcarriers at receiver 212. Each receiver 212 may generate an electrical signal output that corresponds to a data stream for an individual subcarrier (DATA #1, DATA #2, and DATA #3). The subcarrier data streams may be received by FEC decoder/data de-interleaver 211, which may then output the network payload data.

In operation of network 200 shown in FIG. 2A, SOP 220 may collectively represent an input state of polarization of the subcarriers, as shown. In certain embodiments, SOP 220 may be aligned to a given axis, such as an axis associated with transmitter 210. After applying the methods described herein for polarization control, each subcarrier may be modified to a desired SOP 222 prior to combination at multiplexer 208. In network 200, SOP 223 may represent an optimized state of polarization of the combined multi-carrier optical signal that is suited for routing through optical transmission network 202 with reduced degradation of OSNR, compared to other orientations of SOP. After routing through OTN 202, the multi-carrier optical signal may arrive at a receiving end of OTN 202 having SOP 224, as described above. After separation into subcarriers at element 209, receiver 212 may receive the subcarrier signals with arbitrary SOP 225.

Figure 2B:
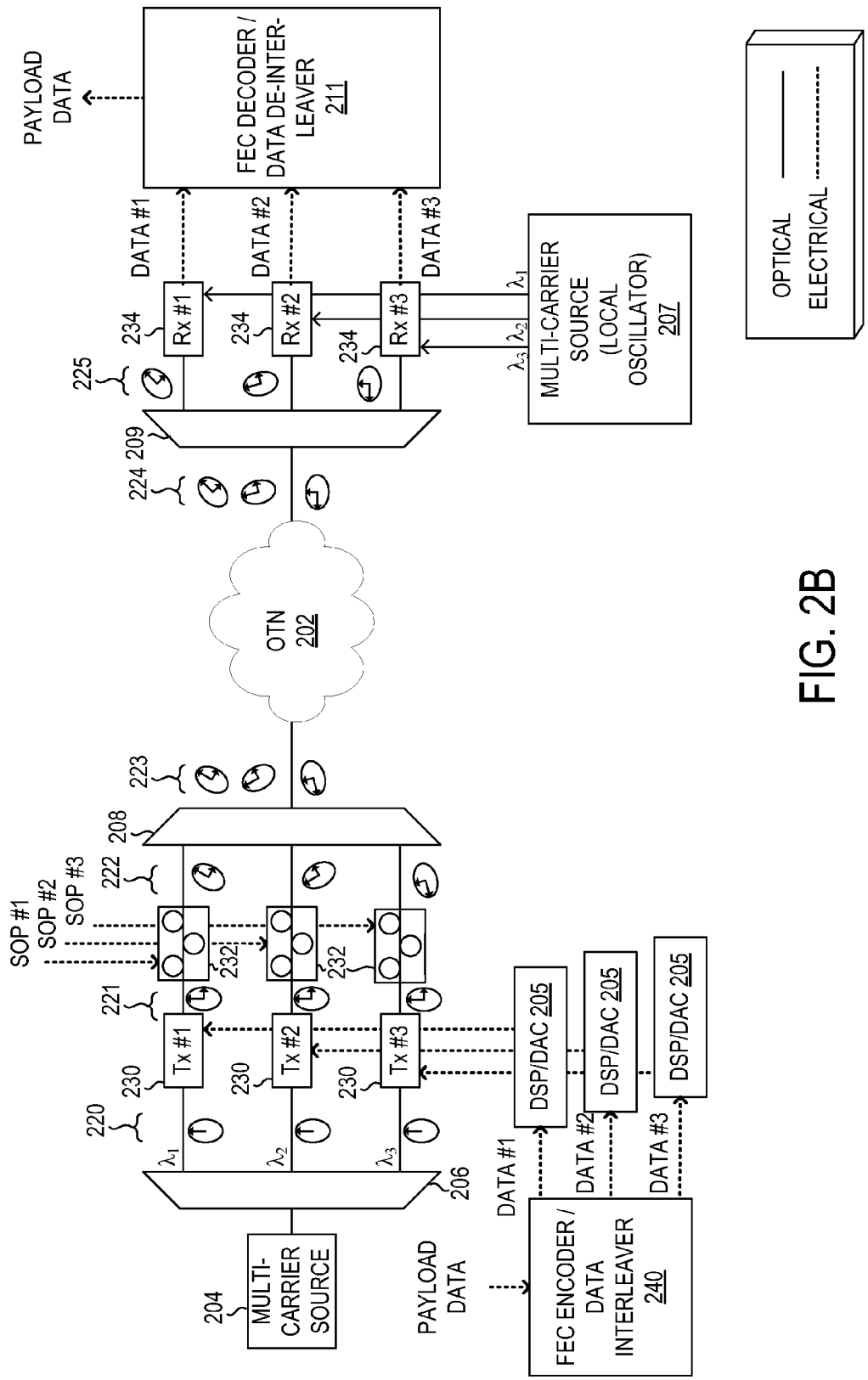

Referring now to FIG. 2B, a block diagram of selected elements of an embodiment of network 201, which may employ polarization control to mitigate polarization dependent loss, is shown. As shown in FIG. 2B, at least certain portions of network 201 may correspond to elements depicted in network 101 (see FIG. 1). In network 201, various optically transmitting elements are collectively shown as OTN 202, which may include various components described above with respect to network 101 (see FIG. 1), such as optical and/or digital network components for transmission of multi-carrier optical signals. In FIG. 2B, network 201 is shown implementing polarization control of individual subcarriers of a super-channel in the optical domain using certain individual components for each subcarrier. Although network 201 is shown in FIG. 2B transmitting three subcarriers at arbitrary wavelengths $\lambda_1$, $\lambda_2$, and $\lambda_3$, it will be understood that in other embodiments (not shown), different numbers of subcarriers may be used. In network 201, payload data is transmitted across OTN 202 using three subcarriers, labeled as DATA #1, DATA #2, and DATA #3. In certain embodiments, the subcarriers are modulated using dual polarization quadrature phase shift keying (DP-QPSK). At least certain portions of network 300 may represent a polarization control system for setting states of polarization of individual subcarriers included in a multi-carrier optical signal.

In FIG. 2B, multicarrier source 204 may represent a source of signals for a plurality of subcarriers, as shown in FIG. 2A. As shown, multicarrier source 204 may generate three monochromatic wavelengths, whose arbitrary values are given by $\lambda_1$, $\lambda_2$, and $\lambda_3$, that are separated and individually output at demultiplexer 206 having SOP 220 that may be aligned to a given axis, for example, an axis of a modulator included in transmitter 230. At transmitter 230, each subcarrier may be independently modulated with corresponding payload data provided by digital signal processor/digital-to-analog converters (DSP/DAC) 205, which may operate in the electrical/digital domain. As shown, FEC encoder/data interleaver 240 may receive the payload data stream and generate the subcarrier data streams, DATA #1, DATA #2, and DATA #3, which are fed to respective DSP/DACs 205 for each respective subcarrier and generate output signals for modulation at transmitter 230, which may generate dual polarized, orthogonal SOP 221. In certain embodiments, transmitter 230 includes a dual polarization IQ modulator, as described previously. Then, an SOP of each subcarrier may be independently rotated according to polarization parameters, corresponding to specific values for ($\theta,\psi$), shown as SOP #1, SOP #2, and SOP #3, that are respectively received at polarization controller 232, resulting in arbitrary SOP 222.

In FIG. 2B, after optical combination into a multi-carrier optical signal (i.e., a super-channel) at multiplexer 208, each subcarrier maintains its arbitrary SOP 222, shown as combined SOP 223. The multi-carrier optical signal may then be transmitted over optical OTN 202. During transmission over OTN 202, the SOP of the subcarriers may vary randomly due to various transmission effects, such as microbending and/or stress, which may cause a small birefringence in the optical fiber that results in rotations of SOP. In certain embodiments, the relative SOPs of the subcarriers may be retained to a certain extent after transmission over OTN 202.

In FIG. 2B, upon arrival at a receiving end of network 201, the multi carrier optical signal may exhibit SOP 224, which may have varied from SOP 223 due to the transmission effects mentioned above. For example, in network 201, SOP 224 may represent a common rotation from SOP 223 for all subcarriers, while a relative rotation among the subcarriers is maintained. The multi-carrier optical signal may be optically separated into subcarrier components at demultiplexer 209, where the subcarriers have SOP 225. Each subcarrier may then be fed into respective receiver 234, that may include a local oscillator and a polarization diversity 90 degree optical hybrid (not shown), and may perform optical-to-electrical conversion, demodulation, and/or digital domain processing. As in network 200 (see FIG. 2A), receiver 234 in network 201 may be a polarization diversity coherent receiver that can demultiplex two orthogonal polarization components using DSP for phase and polarization recovery, irrespective of the incoming SOPs of the dual polarized optical signal. As shown in network 201, multi-carrier source (local oscillator) 207 may provide reference wavelengths ($\lambda_1$, $\lambda_2$, and $\lambda_3$) for mixing with individual subcarriers at receiver 234. Each receiver 234 may generate an electrical signal output that corresponds to a data stream for an individual subcarrier (DATA #1, DATA #2, and DATA #3). The subcarrier data streams may be received by FEC decoder/data de-interleaver 211, which may then output the network payload data. In various embodiments, element 209 in FIG. 2B may represent an optical coupler/splitter such that the received super-channel signal is communicated to each receiver 234 (not shown), while a subcarrier signal may be selected by tuning a wavelength of a local oscillator (not shown) included in receiver 234 and the other subcarrier channels are rejected by an electrical filter.

In operation of network 201 shown in FIG. 2B, SOP 220 may collectively represent an input SOP of the subcarriers, as shown. In certain embodiments, SOP 220 may be aligned to a given axis, such as an axis associated with transmitter 230. After applying the methods described herein for polarization control, each subcarrier may be modified to a desired SOP 222 prior to combination at multiplexer 208. In network 201, combined SOP 223 may represent an optimized SOP of the multi-carrier optical signal that is suited for routing through optical transmission network 202 with reduced degradation of OSNR, compared to other orientations of SOP. After routing through OTN 202, the multi-carrier optical signal may arrive at a receiving end of OTN 202 having SOP 224, as described above. After separation into subcarriers at element 209, receiver 234 may receive the subcarrier signals with arbitrary SOP 225.

Figure 3A:
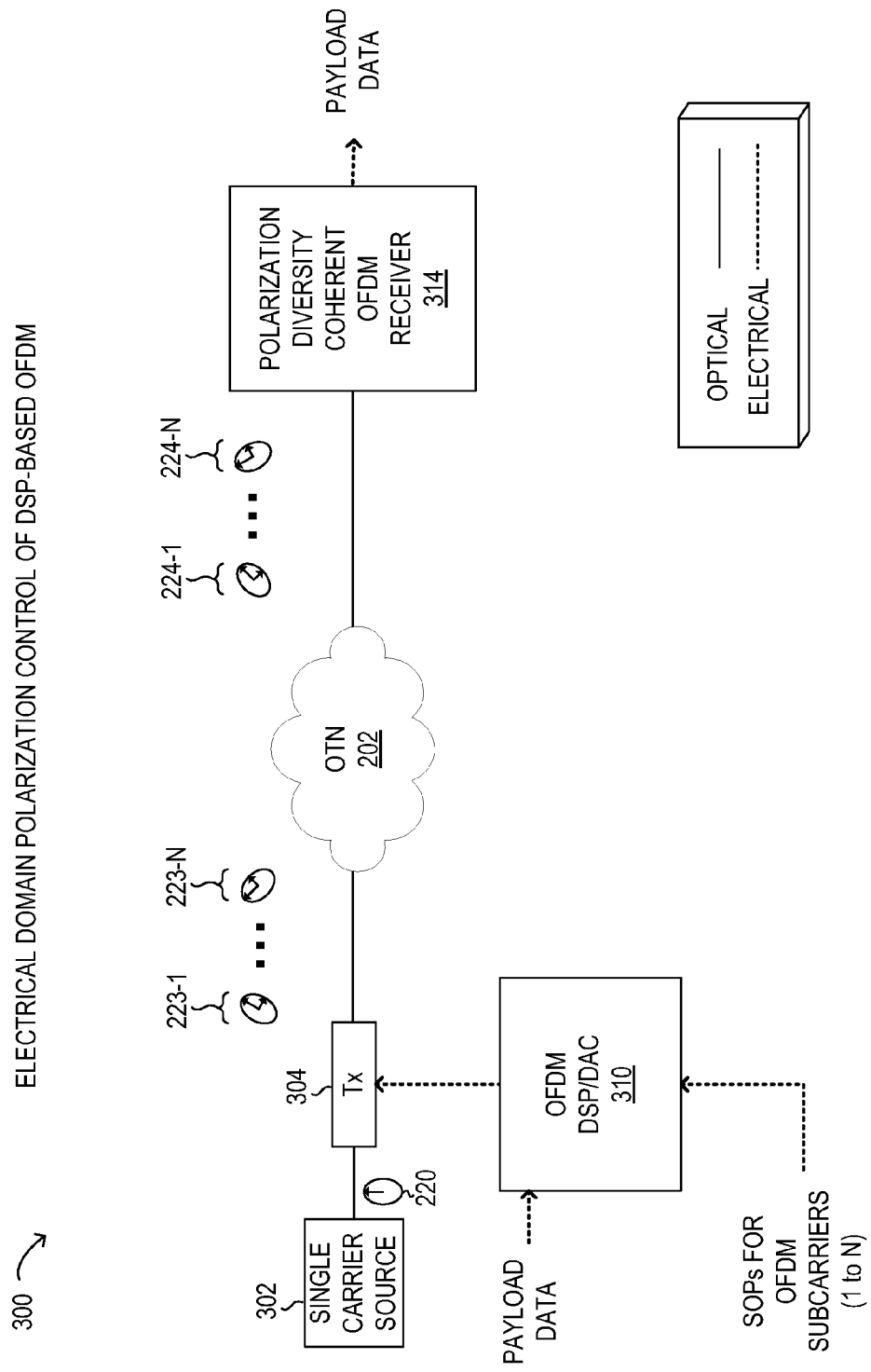
FIGS. 3A, 3B, 3C, and 3D are block diagrams of selected elements of an embodiment of polarization control in an optical network.

Referring now to FIG. 3A, a block diagram of selected elements of an embodiment of network 300, which may employ polarization control to mitigate polarization dependent loss, is shown. As shown in FIG. 3A, at least certain portions of network 300 may correspond to elements depicted in network 101 (see FIG. 1). In network 300, various optically transmitting elements are collectively shown as OTN 202, which may include various components described above with respect to network 101 (see FIG. 1), such as optical and/or digital network components for transmission of multi-carrier optical signals. In FIG. 3A, network 300 is shown implementing polarization control of individual OFDM subcarriers in the digital domain. As such, network 300 may be used for polarization control of DSP-based OFDM, as described previously. As shown in FIG. 3A, network 300 transmits an OFDM signal. It will be understood that the number of subcarriers within the OFDM band may be varied in different embodiments. In certain embodiments, the subcarriers are modulated using dual polarization quadrature phase shift keying (DP-QPSK). At least certain portions of network 300 may represent a polarization control system for setting states of polarization of individual subcarriers included in a multi-carrier optical signal.

In FIG. 3A, single carrier source 302 may represent a source of a monochromatic carrier signal. As shown, single carrier source 302 may generate a monochromatic wavelength that is output having SOP 220 that is aligned to a given axis, as described previously. At transmitter 304, the OFDM signal may be modulated with corresponding payload data provided by OFDM digital signal processor/digital-to-analog converter (OFDM DSP/DAC) 310, which may operate in the electrical/digital domain. As shown, OFDM DSP/DAC 310 may receive the payload data and SOP inputs for each individual subcarrier, and may subsequently generate output signals for modulation at transmitter 304 (see also FIG. 3B). In network 300, OFDM DSP/DAC 310 may include FEC encoding as well as data interleaving/mapping of individual channels to subcarriers in the OFDM signal based on subcarrier mapping data (not shown). Using the subcarrier mapping data, OFDM DSP/DAC 310 may generate I and Q for dual polarization optical IQ modulation at transmitter 304, which allows each subcarrier to be independently polarized according to polarization parameters, corresponding to specific values for ($\theta, \psi$).

In FIG. 3A, after modulation and polarization to generate a multi-carrier optical signal, the subcarriers maintains desired SOP 223, shown as SOP for a subcarrier corresponding to a first OFDM subcarrier, and so on, up SOP 223-N for the Nth OFDM subcarrier. The multi-carrier optical OFDM signal may then be transmitted over OTN 202 and may exhibit SOP 224 upon arrival at a receiving end of network 300. SOP 224 is shown as SOP 224-1 for the first OFDM subcarrier, and so on, up to SOP 224-N for the Nth OFDM subcarrier. At the receiving end of network 300, polarization diversity coherent OFDM receiver 314 may decode the optical signal and output the payload data.

In operation of network 300 shown in FIG. 3A, SOP 220 may represent an aligned input SOP of the single carrier. After applying the methods described herein for polarization control, each subcarrier may be modified to a desired SOP 223 using OFDM DSP/DAC 310. In network 300, SOP 223 may represent an optimized SOP of the multi-carrier optical signal that is suited for routing through OTN 202 with reduced degradation of OSNR. After routing through OTN 202, the multi-carrier optical signal may be received in SOP 224. At polarization diversity coherent OFDM receiver 314, the real part and the imaginary part of the electric field of the optical signal may be directly measured. For example, coherent OFDM receiver 314 may employ a local oscillator to interfere with the incoming optical signal to separate the real and imaginary signal portions. Furthermore, polarization diversity coherent OFDM receiver 314 may employ DSP to accurately recover both phase and polarization in a reliable manner to perform polarization demultiplexing and channel demultiplexing (see also FIGS. 3B and 3C).

Figure 3B:
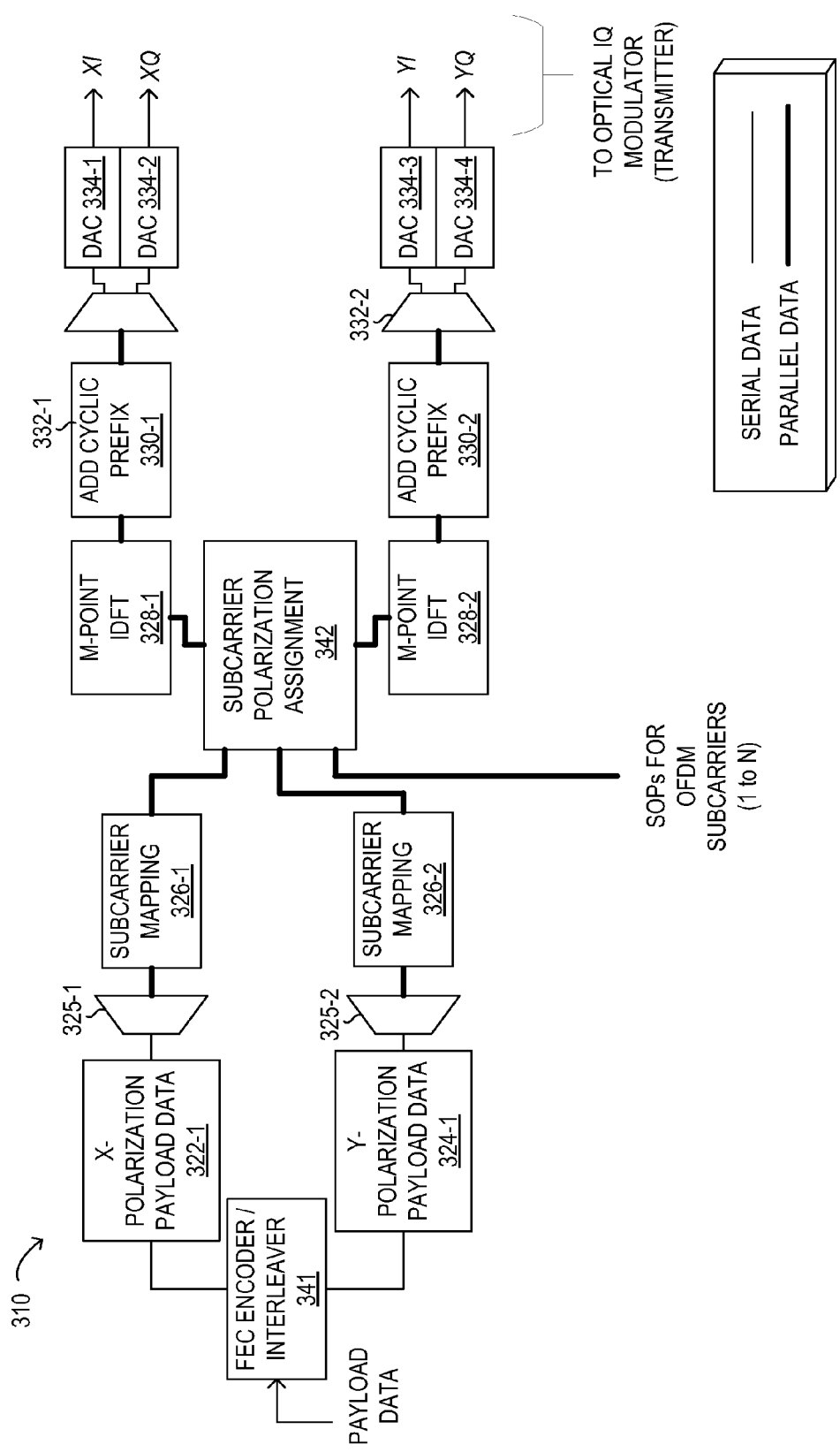

Referring now to FIG. 3B, a block diagram of selected elements of an embodiment of OFDM DSP/DAC 310, which may correspond to the like element depicted in network 300 (see FIG. 3A). It is noted that in FIG. 3B, parallel data is indicated with a bold connecting line.

In FIG. 3B, payload data may be received by FEC encoder/interleaver 341 as X-polarization payload data 32-1 and Y-polarization payload data 324-1 for transmission over OTN 202. As shown in FIG. 3B, it is assumed that the incoming payload data are being uniformly interleaved to result in X-polarization payload data 322-1 and Y-polarization data 324-1. It will be understood that, in different embodiments, at least certain portions of FEC encoder/interleaver 341 may be omitted, for example, when two separate incoming payload data streams are directly received as X-polarization payload data 322-1 and Y-polarization data 324-1 (not shown). From X-polarization payload data 322-1 and Y-polarization payload data 324-1, elements 325-1 and 325-2 may represent serial-to-parallel conversion for X and Y data, respectively. Subcarrier mapping 326-1 and 326-2 may provide mapping information (in parallel) for OFDM subcarriers 1 to N in each polarization component (X and Y) to subcarrier polarization assignment 342, which may control the SOP of the dual-polarization subcarrier signals in the electrical domain (see also FIG. 3C). Then, M-point inverse discrete Fourier transform (IDFT) 328-1 and 328-2, where M is a factor of 2, may be performed respectively for X- and Y-polarization data. A cyclic prefix may be added at add cyclic prefix 330-1 and 330-2, respectively. At elements 332-1 and 332-2, parallel to serial conversion may be performed. Finally digital to analog conversion (DAC) may be performed to generate signals for input to an optical IQ modulator. DACs 334-1 and 334-2 may respectively generate XI and XQ modulation input signals, while DACs 334-3 and 334-4 may respectively generate YI and YQ modulation input signals.

Figure 3C:
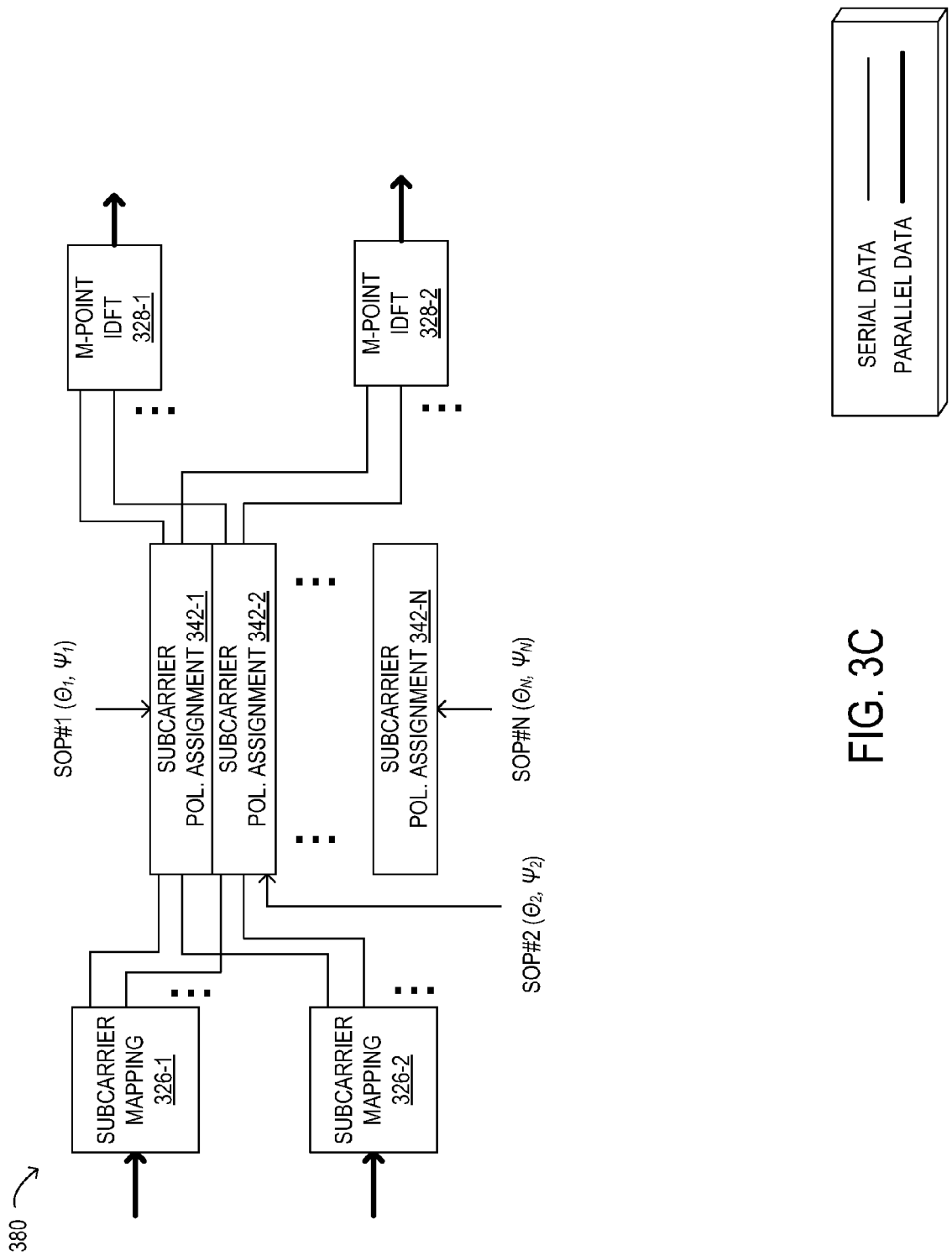

Referring now to FIG. 3C, a block diagram of selected elements of an embodiment of subcarrier polarization processing 380 are shown. Elements depicted in FIG. 3C may correspond to like elements depicted in FIG. 3B. In FIG. 3C, although signal paths for a first and second subcarrier only are shown for descriptive clarity, it will be understood that N subcarriers may be processed accordingly.

In FIG. 3C, subcarrier polarization assignment 342 is depicted as a multiple-input multiple-output structure capable of parallel processing over N dual-polarization component subcarriers. Specifically, X-polarization components for individual subcarriers may be received from subcarrier mapping 326-1, while Y-polarization components for individual subcarriers may be received from subcarrier mapping 326-2. Then, subcarrier polarization assignment 342-1 may receive SOP data, as well as X- and Y-polarization components for subcarrier #1, while subcarrier polarization assignment 342-2 may receive SOP data, as well as X- and Y-polarization components for subcarrier #2, and so on, up to subcarrier #N. The SOP data may comprise values for θ and ψ, as described herein. Then, the X- and Y-polarization components may be received by M-point IDFT 328 for further processing (see also FIG. 3B). Specifically, M-point IDFT 328-1 may receive X- and Y-polarization components for subcarrier #1, while M-point IDFT 328-2 may receive X- and Y-polarization components for subcarrier #2, and so on, up to N subcarriers.

Figure 3D:
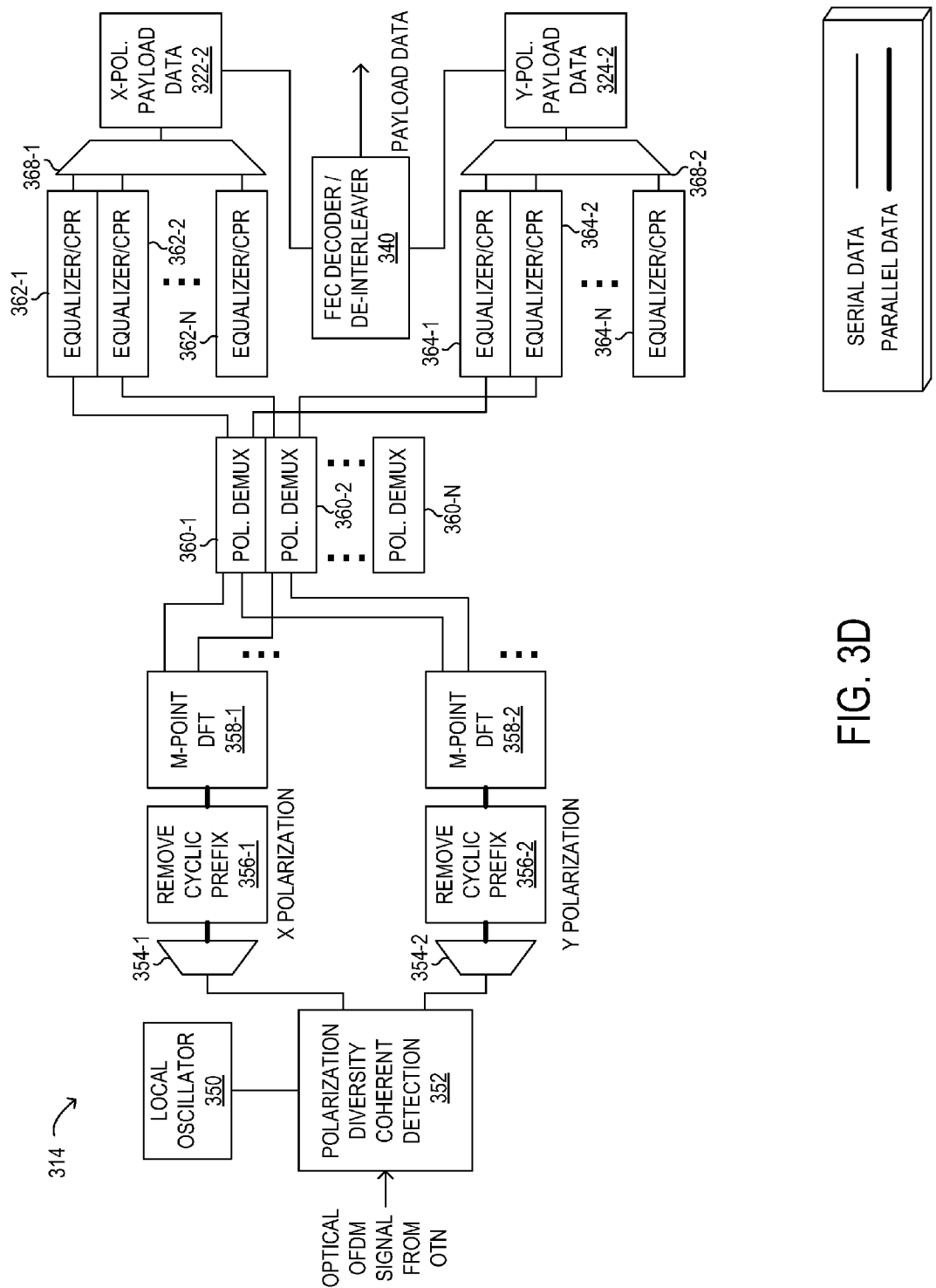

Referring now to FIG. 3D a block diagram of selected elements of an embodiment of polarization diversity coherent receiver 314, which may correspond to the like element depicted in network 300 (see FIG. 3A). In FIG. 3D, signal processing elements of polarization diversity coherent receiver 314 are particularly shown in further detail.

In FIG. 3D, the optical OFDM signal may be received from the OTN by polarization diversity coherent detection 352, using local oscillator 350, to generate intermediate X- and Y-polarization components. Then, at elements 354-1 and 354-2, serial to parallel conversion may be performed on the intermediate X- and Y-polarization components, respectively. A cyclic prefix may be removed at remove cyclic prefix 356-1 and 356-2, respectively. OFDM demultiplexing using DSP may be performed at M-point discrete Fourier transform (DFT) 358-1 and 358-2, respectively. Then, at polarization demultiplexing 360, the polarization components are realigned to demultiplex the polarization of the original X-polarization and Y-polarization signals. In certain embodiments, a constant modulus algorithm (CMA) may be used to find an inverse polarization rotation matrix to reverse the rotational polarization that occurs in transmission over fiber to recover the original polarization state at the transmitter. Specifically, polarization demultiplexer 360-1 may receive X- and Y-polarization components for a first OFDM subcarrier, and output original X- and Y-polarization components. Similarly, polarization demultiplexer 360-2 may recover original X- and Y-polarization components for a second OFDM subcarrier, and so on, up to polarization demultiplexer 360-N. In FIG. 3D, although signal paths for a first and second subcarrier only are shown for descriptive clarity, it will be understood that N subcarriers may be processed accordingly. Then, equalization and carrier phase recovery (CPR) may be performed for individual X- and Y-polarization subcarriers to compensate for phase noise at local oscillator 350 with respect to an original phase at the transmitter and carrier phase noise. Specifically, equalizer/CPR 362-1 may process the X-polarization component for the first subcarrier, while equalizer/CPR 362-2 may process the X-polarization component for the second subcarrier, and so on for the X-polarization component for the Nth subcarrier at equalizer/CPR 362-N. Similarly, equalizer/CPR 364-1 may process the Y-polarization component for the first subcarrier, while equalizer/CPR 364-2 may process the Y-polarization component for the second subcarrier, and so on for the Y-polarization component for the Nth subcarrier at equalizer/CPR 364-N. Then, at elements 368, parallel to serial conversion may be performed on the polarization components received from polarization demultiplexer 360. Specifically, element 368-1 may perform parallel to serial conversion on the X-polarization component, while element 368-2 may perform parallel to serial conversion on the Y-polarization component. The outputs from elements 368 may represent the original payload data for X- and Y-polarization components for N subcarriers. Specifically, X-polarization payload data 322-2 may be received from element 368-1, while Y-polarization payload data 324-2 may be received from element 368-2. Finally, at FEC decoder/de-interleaver 340, the X- and Y-polarization data may be de-interleaved to generate the original payload data (see also FIG. 3B). As noted with respect to FIG. 3B above, in certain embodiments (not shown), at least certain portions of FEC decoder/de-interleaver 340 may be omitted, as desired.

Figure 4:
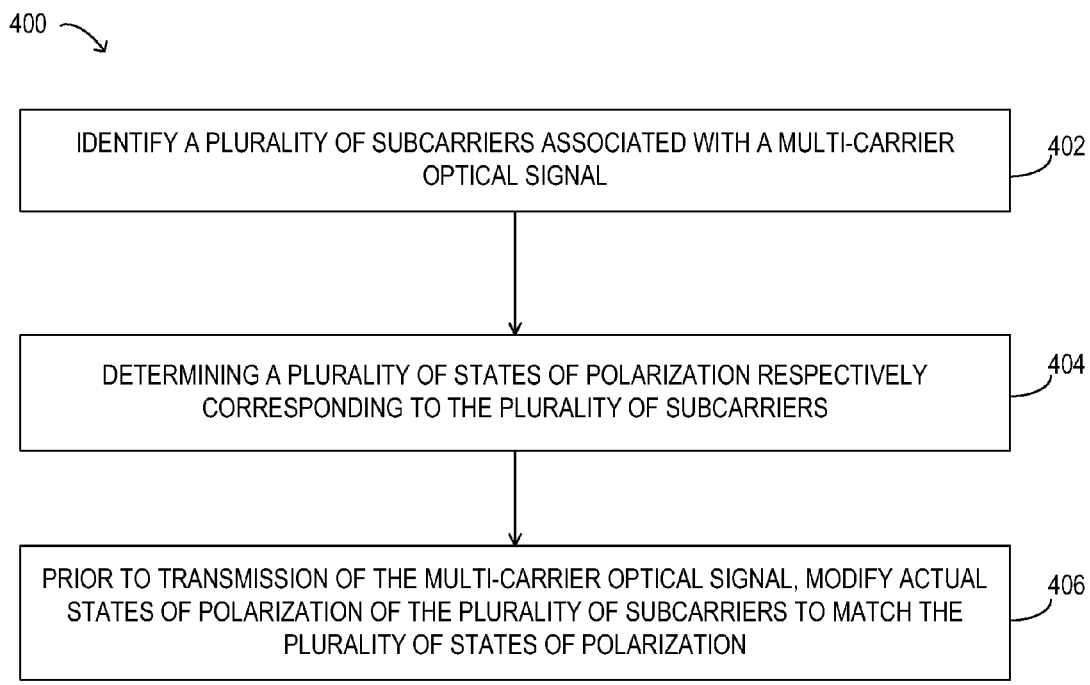
FIGS. 4-7 are flow charts of selected elements of a method for performing polarization control in an optical network.

Referring now to FIG. 4, a block diagram of selected elements of an embodiment of method 400 for polarization control of subcarriers at a transmitter is depicted in flow-chart form. Method 400 may be performed using a simulation model to achieve desired subcarrier SOPs for transmission over networks 200, 201 and/or 300 (see FIGS. 2A, 2B and 3). For example, the simulation model may calculate and/or estimate the effect of PDL tributaries on a subcarrier signal over a simulated OTN. It is noted that certain operations described in method 400 may be optional or may be rearranged in different embodiments.

In FIG. 4, method 400 may begin by identifying (operation 402) a plurality of subcarriers associated with a multi-carrier optical signal. A plurality of states of polarization respectively corresponding to the plurality of subcarriers may be determined (operation 404). Prior to transmission of the multi-carrier optical signal, actual states of polarization of the plurality of subcarriers may be modified (operation 406) to match the plurality of states of polarization.

Figure 5:
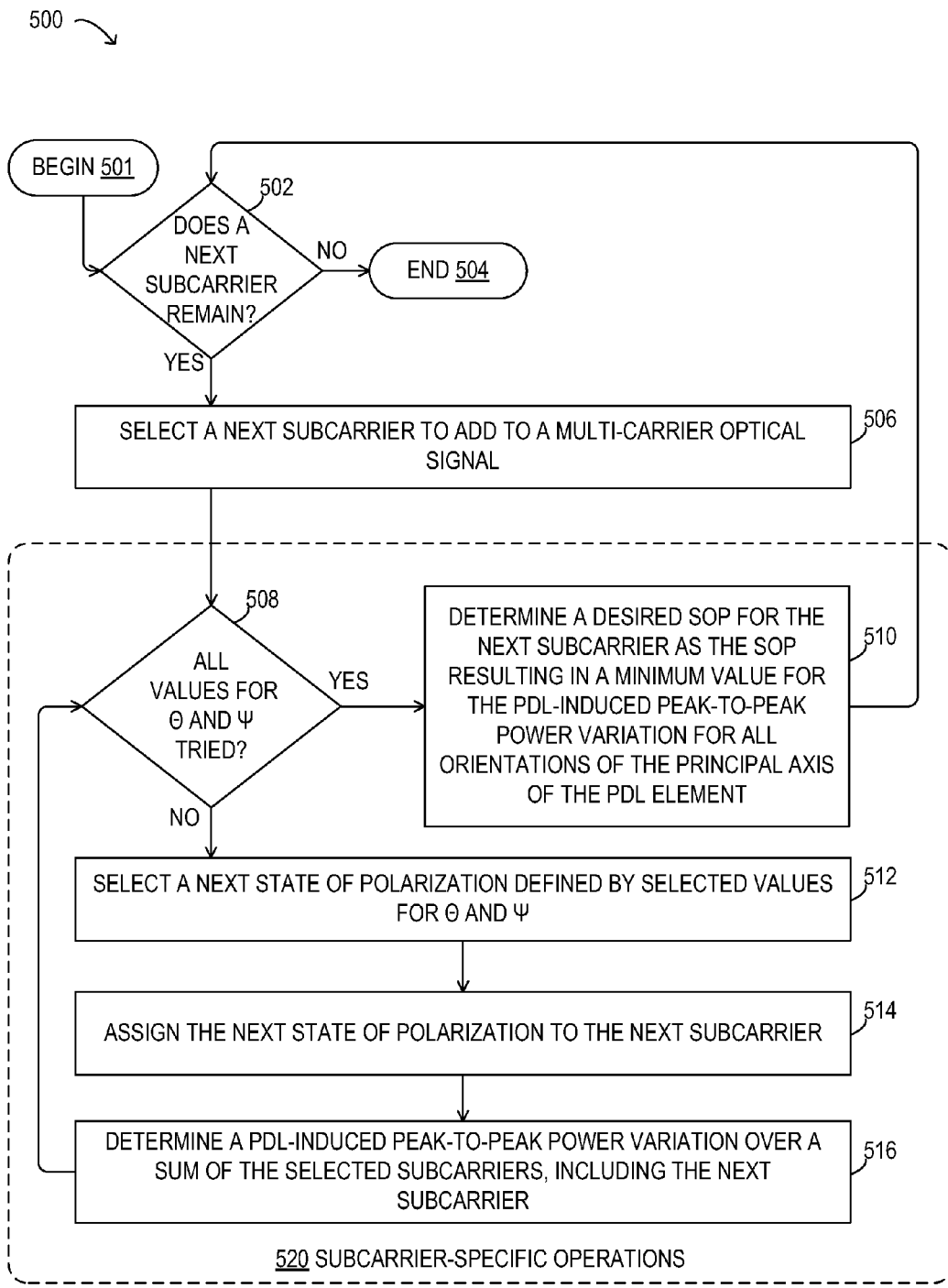

Referring now to FIG. 5, a block diagram of selected elements of an embodiment of method 500 for polarization control of subcarriers at a transmitter is depicted in flow-chart form. It is noted that certain operations described in method 500 may be optional or may be rearranged in different embodiments. In particular embodiments, method 500 may represent an implementation of operation 404 to determine the plurality of states of polarization in method 400 (see FIG. 4). It is noted that at least some portions of method 500 may be performed in the digital domain.

As described below, method 500 may represent a first polarization assignment method for operation 404 (see FIG. 4), in which, as a subcarrier is added to the multi-carrier optical signal, a number of possible states of polarization for the subcarrier may be iteratively determined and evaluated for a resulting PDL-induced peak-to-peak power variation over a sum of the individual subcarrier signals. The PDL-induced peak-to-peak power variation may be determined in method 500 using a simulation model that includes a simulated PDL element (not shown), representing characteristic PDL for a typical optical network. The state of polarization resulting in a minimized sum of PDL-induced peak-to-peak power (or intensity) variation may be selected for the subcarrier. The first polarization assignment method may then be iteratively repeated for each successive subcarrier added to the multi-carrier optical signal. It is noted that the first polarization assignment method may be particularly well suited when a relatively small number of subcarriers are present.

Method 500 begins (operation 501) by making a decision whether a next subcarrier remains (operation 502) for processing by method 500. When the result of operation 502 is NO, method 500 may end (operation 504). When the result of operation 502 is YES, method 500 may proceed by selecting (operation 506) a next subcarrier to add to a multi-carrier optical signal. It is noted that remaining operations in method 500 are shown included in subcarrier-specific operations 520 that are performed on a single subcarrier selected in operation 506. Method 500 may proceed by making a decision whether all values for θ and ψ (see Equation 3 above), representing specific states of polarization, have been iterated. When the result of operation 508 is YES, method 500 may determine (operation 510) a desired state of polarization for the next subcarrier as the state of polarization resulting in a minimum sum of the PDL-induced peak-to-peak power variation of each subcarrier channel for all orientations of a principal axis of the simulated PDL element. The PDL-induced peak-to-peak power variation may be determined in operation 516 of method 500. As used in method 500, the next state of polarization refers to the state of polarization selected in iterations of operation 512. After operation 510, method 500 may loop back to operation 502. When the result of operation 508 is NO, method 500 may select (operation 512) a next state of polarization defined by values for θ and ψ. It is noted that the range of 'all' values for θ and ψ, as described in operation 508, and selected from in operation 512, may be constrained to a particular resolution or other limits, and may accordingly refer to a limited set of value pairs for θ and ψ for the purposes of performing method 500. The next state of polarization may be assigned (operation 514) to the next subcarrier. Then, a next PDL-induced peak-to-peak power variation over a sum of the selected subcarriers, including the next subcarrier, may be determined (operation 516). As used in method 500, the next PDL-induced peak-to-peak power variation refers to the PDL-induced peak-to-peak power variation determined in iterations of operation 516. After operation 516, method 500 may loop back to operation 508.

Figure 6:
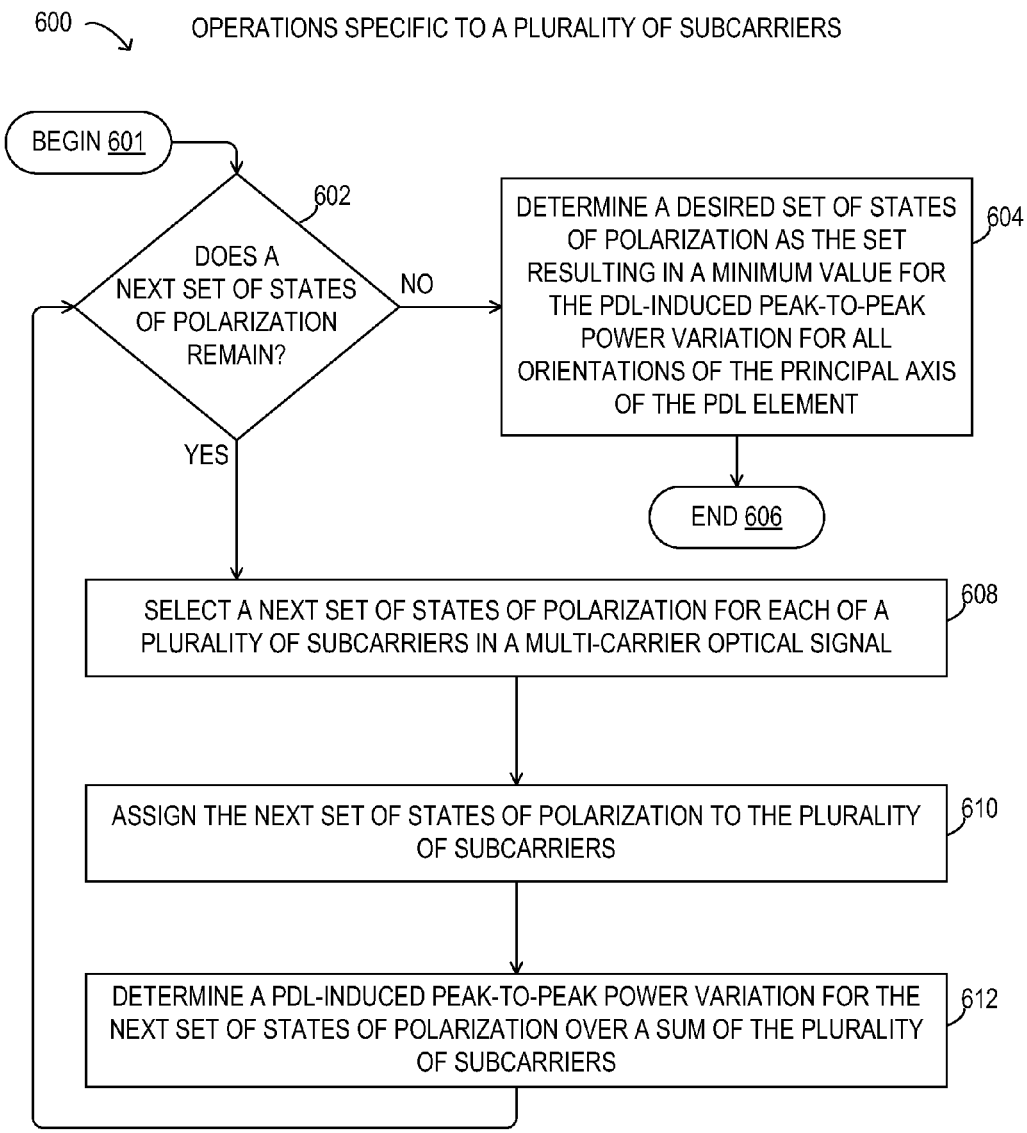

Referring now to FIG. 6, a block diagram of selected elements of an embodiment of method 600 for polarization control of subcarriers at a transmitter is depicted in flow-chart form. It is noted that certain operations described in method 600 may be optional or may be rearranged in different embodiments. In particular embodiments, method 600 may represent an implementation of operation 404 to determine the plurality of states of polarization in method 400 (see FIG. 4). It is noted that at least some portions of method 600 may be performed in the digital domain.

As described below, method 600 may represent a second polarization assignment method for operation 404 (see FIG. 4), in which a number of possible sets of states of polarization corresponding to a plurality of subcarriers may be iteratively determined and evaluated for a resulting PDL-induced peak-to-peak power variation in the multi-carrier optical signal. The PDL-induced peak-to-peak power variation may be determined in method 500 using a simulation model that includes a simulated PDL element (not shown), representing characteristic PDL for a typical optical network. In other words, the second polarization assignment method may iterate through possible sets of states of polarization, such that a state of polarization for each subcarrier is evaluated in each iteration. In this regard, the second polarization assignment method, as represented by method 600, may represent operations specific to a given plurality of subcarriers. The second polarization method may be iteratively repeated for each successive set of states of polarization and select a set of states of polarization that results in a minimal sum of PDL-induced peak-to-peak power variation of each subcarrier channel in the multi-carrier optical signal for all orientations of a principle axis of the simulated PDL element.

Method 600 may begin (operation 601) by making a decision whether a next set of states of polarization remain (operation 602). When the result of operation 602 is NO, method 600 may assign (operation 604) the next set of states of polarization resulting in a minimum value for sum of the PDL-induced the peak-to-peak power variation of each subcarrier channel for all orientations of a principal axis of the simulated PDL element. The PDL-induced peak-to-peak power variation referred to in operation 604 may be determined in operation 612. As used in method 600, the next set of states of polarization refers to the set of states of polarization selected in iterations of operation 608. After operation 604, method 600 may end (operation 606). When the result of operation 602 is NO, method 600 may continue by selecting (operation 608) a next set of states of polarization for each of a plurality of subcarriers in a multi-carrier optical signal. The next set of states of polarization may be assigned (operation 610) to the plurality of subcarriers. Then, a next PDL-induced peak-to-peak power variation for the multi-carrier optical signal may be determined (operation 612) over a sum of the plurality of subcarriers. As used in method 600, the next PDL-induced peak-to-peak power variation refers to the PDL-induced peak-to-peak power variation determined in iterations of operation 612. After operation 612, method 600 may loop back to operation 602.

It is noted that a third polarization assignment method (not shown), may be implemented with various combinations of at least certain portions of methods 500 and 600 (see FIGS. 5 and 6). For example, in the third polarization assignment method, sets of states of polarization for selected groups within the plurality of subcarriers may be iteratively determined and evaluated for a resulting PDL-induced peak-to-peak power variation. The processing of the groups of subcarriers may be similar to the processing of the plurality of subcarriers described with respect to the second polarization assignment method and/or the first polarization assignment method (i.e., when the group includes a single subcarrier). In certain embodiments, each selected group may be assigned the same set of states of polarization in the third polarization assignment method.

Figure 7:
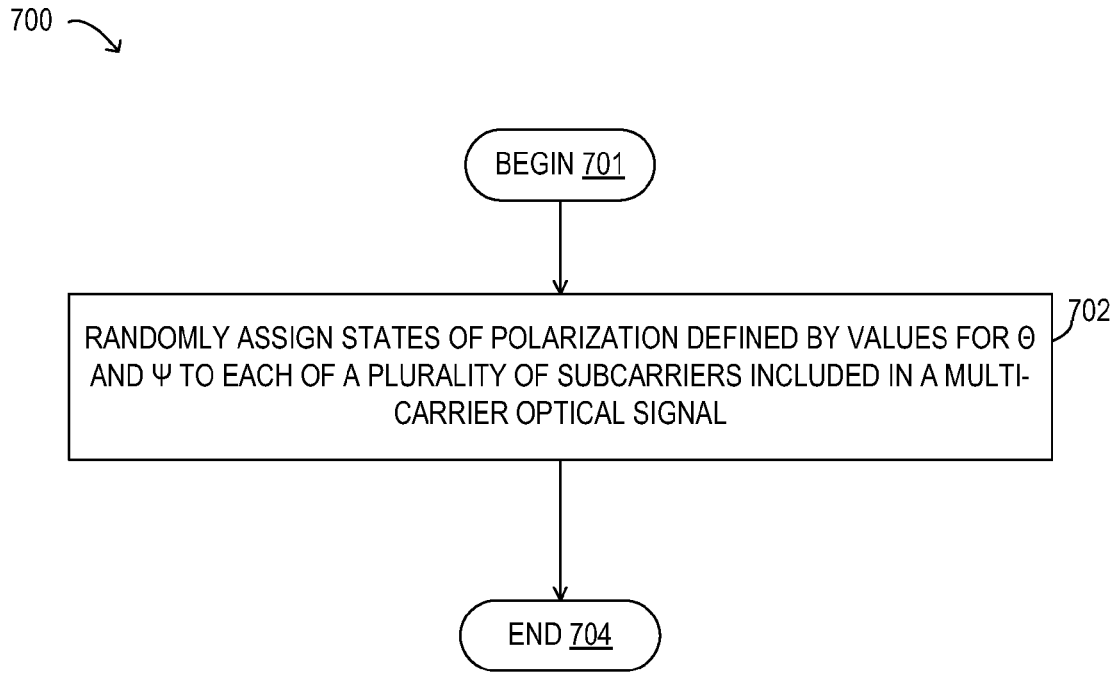

Referring now to FIG. 7, a block diagram of selected elements of an embodiment of method 700 for polarization control of subcarriers at a transmitter is depicted in flow-chart form. It is noted that certain operations described in method 700 may be optional or may be rearranged in different embodiments. In particular embodiments, method 700 may represent an implementation of operation 404 to determine the plurality of states of polarization in method 400 (see FIG. 4). It is noted that at least some portions of method 700 may be performed in the digital domain.

As described below, method 700 may represent a fourth polarization assignment method for operation 404 (see FIG. 4), in which a random state of polarization may be assigned to each subcarrier in the plurality of subcarriers. It is noted that the fourth polarization assignment method may be particularly well suited when large numbers of subcarriers are present. In various embodiments, combinations of at least certain portions of the first, second, third, and/or fourth polarization assignment methods may be used. For example, a set of random states of polarization for a selected group of subcarriers may be assigned and repeated for successive groups of sub carriers.

Method 700 may begin (operation 701) by randomly assigning (operation 702) states of polarization defined by values for $\theta$ and $\psi$ (see Equation 3 above) to each of a plurality of subcarriers included in a multi-carrier optical signal, after which, method 700 may end (operation 704).

As described in detail above, methods and systems for mitigating polarization dependent loss (PDL) in an optical network transmitting a multi-carrier optical signal comprising a plurality of subcarriers may involve assigning and modifying a state of polarization to each subcarrier prior to transmission. An assigned state of polarization for each subcarrier may be modified for the subcarrier in the digital domain and/or the optical domain. Various specific assignment methods may be used, including individual subcarrier assignment, subcarrier set assignment, arbitrary subcarrier group assignment, random assignment, and/or combinations thereof. The assigned states of polarization may be selected based on a resulting minimum PDL-induced peak-to-peak power variation in over a sum of the subcarriers.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for reducing effects of polarization dependent loss (PDL) in an optical network, comprising:
   identifying a plurality of subcarriers associated with a multi-carrier optical signal;
   determining a plurality of states of polarization (SOPs) respectively corresponding to the plurality of subcarriers; and
   prior to transmission of the multi-carrier optical signal, modifying actual states of polarization of the plurality of subcarriers to respectively correspond to the determined plurality of states of polarization,
   wherein the plurality of states of polarization have dual polarization components, and
   wherein determining the plurality of states of polarization further comprises:
      selecting a next subcarrier from unselected subcarriers in the plurality of subcarriers; and
      iteratively repeating, for each selected state of polarization of the next subcarrier:
         selecting a next state of polarization for the next subcarrier;
         assigning the next state of polarization to the next subcarrier; and
         determining a PDL-induced peak-to-peak power variation over a sum of selected subcarriers, including the next subcarrier; and
         selecting a desired state of polarization for the next subcarrier as the next state of polarization resulting in a minimum value for the next PDL-induced peak-to-peak power variation.

2. The method of claim 1, wherein the multi-carrier optical signal is selected from:
   a super-channel; and
   a digital signal processing (DSP)-based orthogonal frequency division multiplexing (OFDM) signal,
   wherein the plurality of subcarriers are tightly packed in the frequency domain.

3. The method of claim 1, wherein determining the plurality of states of polarization further comprises:
   iteratively repeating, for each subcarrier in the plurality of subcarriers:
      selecting a next subcarrier from unselected subcarriers in the plurality of subcarriers;
      iteratively repeating, for each selected state of polarization of the next subcarrier:
         selecting a next state of polarization for the next subcarrier;
         assigning the next state of polarization to the next subcarrier; and
         determining a PDL-induced peak-to-peak power variation over a sum of selected subcarriers, including the next subcarrier; and
      selecting a desired state of polarization for the next subcarrier as the next state of polarization resulting in a minimum value for the next PDL-induced peak-to-peak power variation.

4. The method of claim 1, wherein determining the plurality of states of polarization includes:
   iteratively repeating, for each selected set of states of polarization for the plurality of subcarriers, wherein a set of states of polarization specifies a state of polarization for each subcarrier in the plurality of subcarriers:
      selecting a next set of states of polarization;
      assigning the next set of states of polarization to the plurality of subcarriers; and determining a PDL-induced peak-to-peak power variation for the next set of states of polarization over a sum of the plurality of subcarriers; and selecting a desired set of states of polarization as the next set of states of polarization resulting in a minimum value for the PDL-induced peak-to-peak power variation.

5. The method of claim 1, wherein determining the plurality of states of polarization includes determining a group state of polarization for a group of subcarriers selected from the plurality of subcarriers, further comprising:

iteratively repeating, for each selected set of states of polarization for the group of subcarriers, wherein a set of states of polarization specifies a state of polarization for each subcarrier in the group of subcarriers:
selecting a next set of states of polarization;
assigning the next set of states of polarization to the group of subcarriers; and
determining a PDL-induced peak-to-peak power variation for the next set of states of polarization over a sum of the group of subcarriers; and selecting the group state of polarization as the next set of states of polarization resulting in a minimum value for the PDL-induced peak-to-peak power variation.

6. The method of claim 1, wherein determining the plurality of states of polarization includes:
randomly assigning a state of polarization to each subcarrier.

7. A system for reducing effects of polarization dependent loss (PDL) in an optical network, comprising:
a processor configured to access non-transitory computer readable memory media, wherein the memory media store processor-executable instructions, the instructions, when executed by a processor, cause the processor to:
identify a plurality of subcarriers associated with a multi-carrier optical signal;
determine a plurality of states of polarization (SOPs) respectively corresponding to the plurality of subcarriers; and
prior to transmission of the multi-carrier optical signal, modify actual states of polarization of the plurality of subcarriers to respectively correspond to the determined plurality of states of polarization,
wherein the plurality of states of polarization have dual polarization components, and
wherein the instructions to determine the plurality of states of polarization include instructions to:
select a next subcarrier from unselected subcarriers in the plurality of subcarriers; and
iteratively repeat, for each selected state of polarization of the next subcarrier, instructions to:
select a next state of polarization for the next subcarrier;
assign the next state of polarization to the next subcarrier; and
determine a PDL-induced peak-to-peak power variation over a sum of selected subcarriers, including the next subcarrier; and
select a desired state of polarization for the next subcarrier as the next state of polarization resulting in a minimum value for the next PDL-induced peak-to-peak power variation.

8. The system of claim 7, wherein the multi-carrier optical signal is selected from:
a super-channel; and
a digital signal processing (DSP)-based orthogonal frequency division multiplexing (OFDM) signal,
wherein the plurality of subcarriers are tightly packed in the frequency domain.

9. The system of claim 7, wherein the instructions to determine the plurality of states of polarization include instructions to:
iteratively repeat, for each subcarrier in the plurality of subcarriers:
select a next subcarrier from unselected subcarriers in the plurality of subcarriers;
iteratively repeat, for each selected state of polarization of the next subcarrier:
select a next state of polarization for the next subcarrier;
assign the next state of polarization to the next subcarrier; and
determine a PDL-induced peak-to-peak power variation over a sum of selected subcarriers, including the next subcarrier; and
select a desired state of polarization for the next subcarrier as the next state of polarization resulting in a minimum value for the next PDL-induced peak-to-peak power variation.

10. The system of claim 7, wherein the instructions to determine the plurality of states of polarization include instructions to:
iteratively repeat, for each selected set of states of polarization for the plurality of subcarriers, wherein a set of states of polarization specifies a state of polarization for each subcarrier in the plurality of subcarriers, instructions to:
select a next set of states of polarization;
assign the next set of states of polarization to the plurality of subcarriers; and
determine a PDL-induced peak-to-peak power variation for the next set of states of polarization over a sum of the plurality of subcarriers; and
selecting a desired set of states of polarization as the next set of states of polarization resulting in a minimum value for the PDL-induced next peak-to-peak power variation.

11. The system of claim 7, wherein the instructions to determine the plurality of states of polarization include instructions to determine a group state of polarization for a group of subcarriers selected from the plurality of subcarriers, further comprising instructions to:
iteratively repeat, for each selected set of states of polarization for the group of subcarriers, wherein a set of states of polarization specifies a state of polarization for each subcarrier in the group of subcarriers, instructions to:
select a next set of states of polarization;
assign the next set of states of polarization to the plurality of subcarriers; and
determine a PDL-induced peak-to-peak power variation for the next set of states of polarization over a sum of the group of subcarriers; and
selecting the group state of polarization as the next set of states of polarization resulting in a minimum value for the PDL-induced next peak-to-peak power variation.

12. The system of claim 7, wherein the instructions to determine the plurality of states of polarization include instructions to:
randomly assign a state of polarization to each subcarrier.

13. A polarization control system for reducing the effect of polarization dependent loss (PDL) in an optical network, the polarization control system configured for:
identifying a plurality of subcarriers associated with a multi-carrier optical signal;

determining a plurality of states of polarization (SOPs) respectively corresponding to the plurality of subcarriers; and prior to transmission of the multi-carrier optical signal, modifying actual states of polarization of the plurality of subcarriers to correspond to the determined plurality of states of polarization, wherein the plurality of states of polarization have dual polarization components, and wherein determining the plurality of states of polarization further comprises:
    selecting a next subcarrier from unselected subcarriers in the plurality of subcarriers; and
    iteratively repeating, for each selected state of polarization of the next subcarrier:
        selecting a next state of polarization for the next subcarrier;
        assigning the next state of polarization to the next subcarrier; and
        determining a PDL-induced peak-to-peak power variation over a sum of selected subcarriers, including the next subcarrier; and
    selecting a desired state of polarization for the next subcarrier as the next state of polarization resulting in a minimum value for the PDL-induced next peak-to-peak power variation.

14. The polarization control system of claim 13, wherein the multi-carrier optical signal is selected from:
    a super-channel; and
    a digital signal processing (DSP)-based orthogonal frequency division multiplexing (OFDM) signal,
    wherein the plurality of subcarriers are tightly packed in the frequency domain.

15. The polarization control system of claim 13, wherein determining the plurality of states of polarization further comprises:
    iteratively repeating, for each subcarrier in the plurality of subcarriers:
        selecting a next subcarrier from unselected subcarriers in the plurality of subcarriers;
        iteratively repeating, for each selected state of polarization of the next subcarrier:
            selecting a next state of polarization for the next subcarrier;
            assigning the next state of polarization to the next subcarrier; and
            determining a PDL-induced peak-to-peak power variation over a sum of selected subcarriers, including the next subcarrier; and
        selecting a desired state of polarization for the next subcarrier as the next state of polarization resulting in a minimum value for the PDL-induced next peak-to-peak power variation.

16. The polarization control system of claim 13, wherein determining the plurality of states of polarization includes:
    iteratively repeating, for each selected set of states of polarization for the plurality of subcarriers, wherein a set of states of polarization specifies a state of polarization for each subcarrier in the plurality of subcarriers:
        selecting a next set of states of polarization;
        assigning the next set of states of polarization to the plurality of subcarriers; and
        determining a PDL-induced peak-to-peak power variation for the next set of states of polarization over a sum of the plurality of subcarriers; and
    selecting a desired set of states of polarization as the next set of states of polarization resulting in a minimum value for the PDL-induced peak-to-peak power variation.

17. The polarization control system of claim 13, wherein determining the plurality of states of polarization includes determining a group state of polarization for a group of subcarriers selected from the plurality of subcarriers, further comprising:
    iteratively repeating, for each selected set of states of polarization for the group of subcarriers, wherein a set of states of polarization specifies a state of polarization for each subcarrier in the group of subcarriers:
        selecting a next set of states of polarization;
        assigning the next set of states of polarization to the group of subcarriers; and
        determining a PDL-induced peak-to-peak power variation for the next set of states of polarization over a sum of the group of subcarriers; and
    selecting the group state of polarization as the next set of states of polarization resulting in a minimum value for the PDL-induced peak-to-peak power variation.

18. The polarization control system of claim 13, wherein determining the plurality of states of polarization includes:
    randomly assigning a state of polarization to each subcarrier.

* * * * *